United States Patent [19]
Rault

[11] Patent Number: 5,751,531
[45] Date of Patent: May 12, 1998

[54] PROTECTION CIRCUIT AGAINST HIGH ENERGY OVERVOLTAGES, HAVING A CONTROLLED CLIPPING VOLTAGE

[75] Inventor: Pierre Rault, Saint Cyr/Loire, France

[73] Assignee: SGS-Thomson Microelectronics S.A., Saint Genis, France

[21] Appl. No.: 767,522

[22] Filed: Dec. 16, 1996

Related U.S. Application Data

[63] Continuation of Ser. No. 277,406, Jul. 19, 1994, abandoned.

[30] Foreign Application Priority Data

Jul. 19, 1993 [FR] France ................... 93 09139

[51] Int. Cl.$^6$ ........................... H02H 9/00
[52] U.S. Cl. .................. 361/56; 361/111; 361/118
[58] Field of Search ................... 361/56, 58, 91, 361/111, 115, 117, 118, 127, 103

[56] References Cited

U.S. PATENT DOCUMENTS

| 3,737,725 | 6/1973 | Donnelly . | |
|---|---|---|---|
| 4,086,642 | 4/1978 | Yoshida et al. | 361/91 |
| 5,027,181 | 6/1991 | Larik et al. . | |

FOREIGN PATENT DOCUMENTS

A-3621200  1/1988  Germany ................... H02H 9/04

OTHER PUBLICATIONS

Zener Diode Handbook, Motorola Semiconductor Products Inc., First Edition, May 1967, pp. 1–1 to 10–58.

AN–221 Application Note, 4–Layer and Current–Limiter Diodes Reduce Circuit Cost and Complexity, John Bliss and David Zinder, Motorola Semiconductor Products Inc., pp. 1–5.

Field–Effect Current Regulator Diodes, 1N5283 thru 1N5314, Apr. 1967—DS 2700, Motorola Semiconductor Products Inc.

Field–Effect Current Regulator Diodes, MCL1300 thru MCL1304, Feb. 1968—DS 2701, Motorola Semiconductor Products Inc.

AN–462 Application Note, FET Current Regulators—Circuits and Diodes, Bob Botos, Motorola Semiconductor Products Inc., pp. 1–11.

*Primary Examiner*—Jeffrey A. Gaffin
*Assistant Examiner*—Stephen Jackson
*Attorney, Agent, or Firm*—Wolf, Greenfield & Sacks, P.C.; James H. Morris

[57] ABSTRACT

An overvoltage protection circuit is formed by a voltage clipping component disposed between two inputs of a circuit to be protected, and a current limitation device connected, in series with the voltage clipping component, between one of the inputs and a bias connection terminal.

13 Claims, 3 Drawing Sheets

5,751,531

PROTECTION CIRCUIT AGAINST HIGH ENERGY OVERVOLTAGES, HAVING A CONTROLLED CLIPPING VOLTAGE

This application is a continuation of application Ser. No. 08/277,406, filed Jul. 19, 1994 now abandoned.

BACKGROUND OF THE INVENTION

1. Field of the Invention

The present invention relates to the protection of electronic circuits against accidental overvoltages.

2. Discussion of the Related Art

A simple and conventional method to protect a circuit against accidental overvoltages likely to occur between two terminals of the circuit, is to dispose between its two input terminals a clipping device, the simplest device being an avalanche diode usually referred to as a zener diode.

A drawing of such a conventional protection circuit is illustrated in FIG. 1 in which the circuit to be protected is referenced 1 and includes inputs to be protected, E1 and E2. A zener diode Z1 is disposed between the inputs E1 and E2. Inputs E1 and E2 are connected to external connection terminals T1 and T2 on which an overvoltage may occur. In some cases, a resistor R appears in the connection circuit and has a generally very low and undetermined value.

The occurrence of an overvoltage can be simulated by a voltage source $V_p$ in series with a resistor r having a very small value. In accordance with standards commonly admitted, this source $V_p$ can be considered as providing a 1000-volt overvoltage that drops to 500 volts 50 microseconds later. On a shorted circuit, this source can provide a 500-A current.

The current-voltage (I-V) characteristic curve of a clipping component such as a zener diode is schematically illustrated in FIG. 2. The nominal avalanche voltage of the component is VZ1. However, this avalanche voltage does not remain constant and does not follow curve 10, but varies with the current flowing through the zener diode according to curve 11. Thus, the voltage across the zener diode takes a value VZ1(I), for example V1 or V2, depending on the value of current I in this zener diode during the avalanche phase. In practice, the dynamic resistance of a clipping component is not negligible and, for a clipping component whose nominal avalanche voltage VZ1 is 500 volts, the real voltage V2 across the terminals is, for example, 600 volts for a 40-A pulse current.

This apparatus for protecting a circuit requires selecting a clipping component whose nominal avalanche voltage is substantially lower than a maximum voltage value against which circuit 1 is to be protected. This value can be determined only if the current Ipp flowing through the zener diode during the overvoltage is exactly known. This current Ipp is:

$$Ipp = (Vp - VZI(1))/(r+R).$$

In addition, the peak power dissipated in the clipping component is equal to the product of voltage VZ1(I) across this clipping component by current Ipp. The size, and therefore the cost of the zener diode, depend on this clipping power and on the duration of the overvoltage.

Thus, in practice, considering that the value of R in a given circuit is generally undetermined, the protection zener diodes must be oversized to be sure they will not be destroyed by an overvoltage and to effectively protect circuit 1. It is also necessary to use zener diodes whose nominal voltage is substantially lower than the voltage against which the circuit is to be protected, to take into account the increase of the clipping value caused by the current flow through the zener diode.

The above description has been made in relation to a clipping component such as a zener diode. It will be clear to those skilled in the art that the same phenomenon may occur for any clipping component, for example, for a varistor made of zinc oxide, and that the above explanations also apply to bidirectional clipping components.

SUMMARY OF THE INVENTION

An object of the invention is to provide a protection circuit against overvoltages in which the overvoltage threshold is clearly defined as a function of the characteristics of the selected clipping component.

Another object of the invention is to provide such a circuit that limits the peak power during the occurrence of the overvoltage, thereby allowing to reduce the size and cost of the clipping component.

To achieve these objects, the invention provides an overvoltage protection circuit formed by a voltage clipping component disposed between two inputs of said circuit, that further includes a current limitation device connected between one of the inputs and a terminal for connection to this input.

According to an embodiment of the invention, the current limitation device can withstand a voltage higher than the difference between the maximum value of the overvoltage and the clipping voltage of the clipping component.

According to an embodiment of the invention, the current limitation device is a MOS transistor having its gate and its source connected together, and that is used between its source and its drain.

The foregoing and other objects, features, aspects and advantages of the invention will become apparent from the following detailed description of the present invention when taken in conjunction with the accompanying drawings.

DETAILED DESCRIPTION

Figure 1:
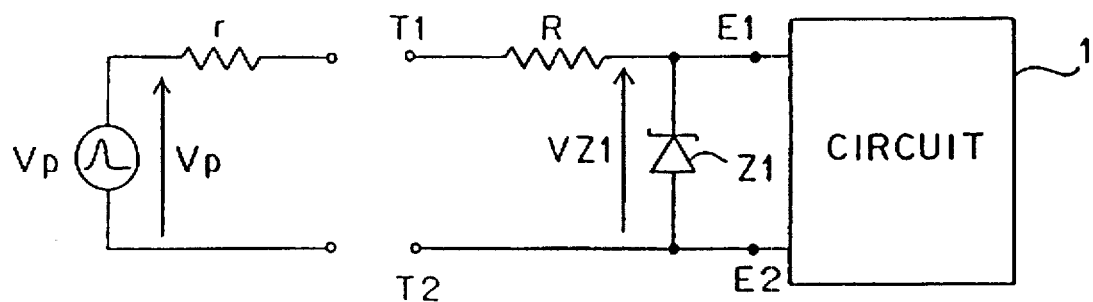
FIG. 1 is a schematic diagram of a prior art clipping component intended to protect a circuit, and an associated perturbation source.
Figure 2:
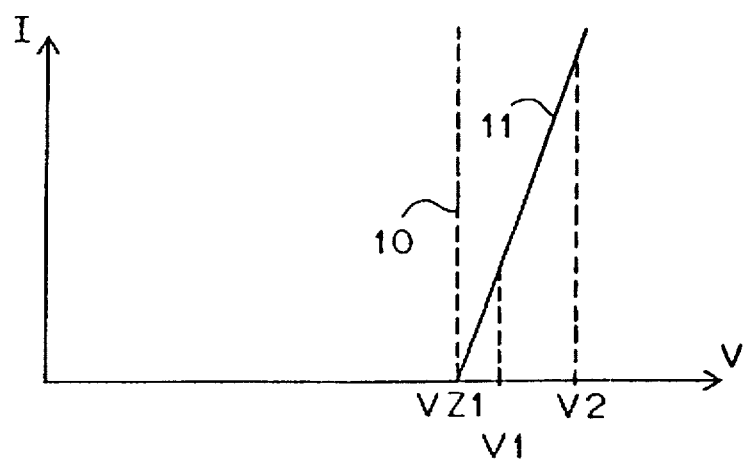
FIG. 2 illustrates a current-voltage curve of the clipping component.
Figure 3:
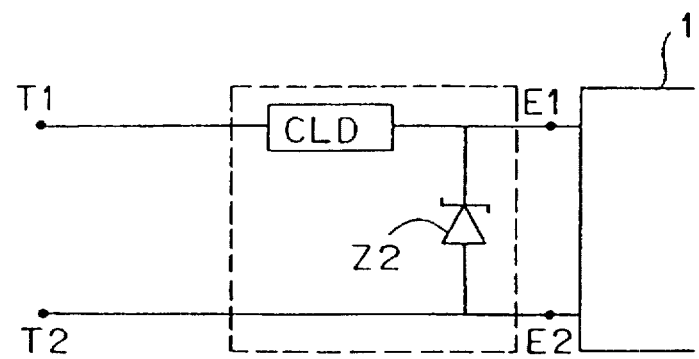
FIG. 3 represents a protection circuit according to the invention.

As shown in FIG. 3, the present invention replaces the clipping component Z1 of FIG. 1 by the combination of a clipping component Z2 disposed in the same way as the clipping component Z1 and a current limitation device CLD connected between the input E1 of the circuit to be protected and the external connection terminal T1 of this circuit.

Figure 3A:
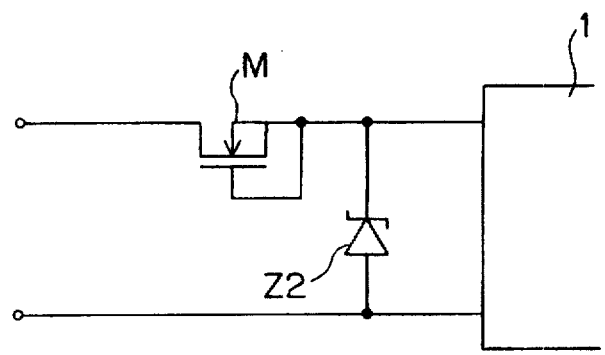
Figure 4:
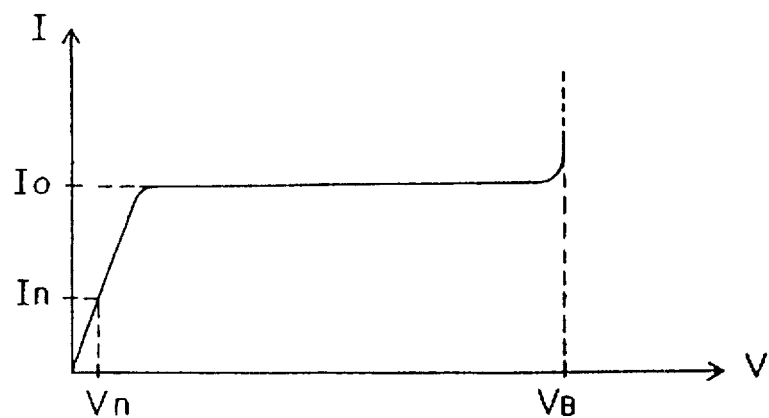
FIG. 4 represents the current-voltage curve of a current limitation device used in the present invention.

The voltage-current characteristic of the current limitation device is such as illustrated in FIG. 4. The current limitation device limits the current to a value $I_0$ and, for a nominal operating current In of circuit 1, it has a very low voltage drop $v_n$. Such a component can, for example, be formed by a depleted MOS or IGBT transistor having its source and its gate interconnected, this component being used between its drain and source terminals. A depleted MOS transistor M connected as described is shown in FIG. 3a. Such a component is described in FR-A-93/05,886 filed on May 10, 1993. In addition, as represented in FIG. 4, such a component can break down beyond a voltage breakdown VB. This breakdown voltage will be selected to be higher than a difference between a maximum possible overvoltage value Vp of the circuit to be protected minus the clipping voltage VCL of the clipping component Z2.

Figure 5:
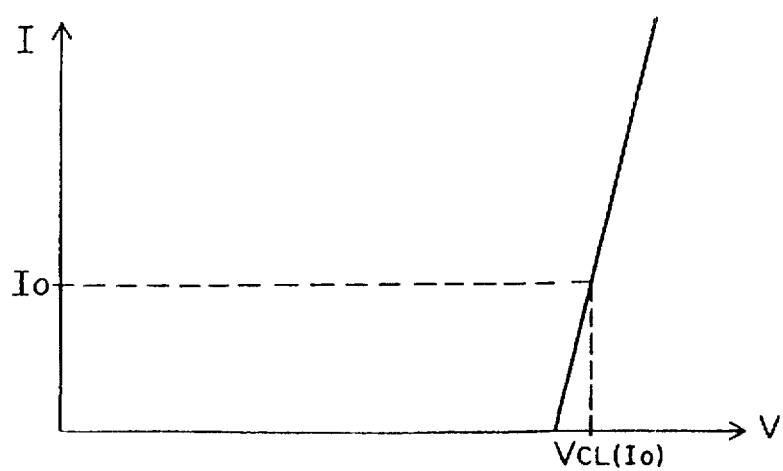
FIG. 5 represents the current-voltage curve of a voltage clipping component used according to the invention.

With such a circuit, the maximum current in the clipping component Z2 during the occurrence of an overvoltage equals $I_0$. As a result, as shown in FIG. 5, the clipping voltage of the clipping component Z2 is fixed to a value $VCL(I_0)$ that can be predetermined. Thus, the peak power to be dissipated in the clipping component Z2 during an overvoltage is:

$$P(Z2)=VCL(I_0) \times I_0. \quad (1)$$

The peak power to be absorbed by the current limitation device CLD is:

$$P(CLD)=[Vp-VCL(I_0)]I_0, \quad (2)$$

the total power being:

$$P_r=V_p \times I_0. \quad (3)$$

To make the advantages of the present invention better understood, a practical example is given hereinafter in which the circuit to be protected is a converter fed by the rectified mains voltage. Assuming this converter can withstand, for example, 500 volts and must be protected against overvoltages that may reach 1000 volts. It is also assumed that the value of total resistance r+R is approximately 12 ohms.

By using the conventional circuit of FIG. 1, current Ipp is:

$$Ipp=(Vp-VCL)/(R+r)=(1000-500)/12=40 \; A.$$

The peak power in the clipping component Z1 is then:

$$P(Z1)=VCL.Ipp=500 \times 40=20 \; kW.$$

In contrast, by using according to the invention a current limitation device that clips the current to 0.5 A, the power consumed during an overvoltage occurring in the clipping device is:

$$P(Z2)=VCL.I_0=500 \times 0.5=250 \; W,$$

and the peak power in the current limitation device is:

$$P(CLD)=[Vpp-VCL(I_0)]I_0=(1000-500)0.5=250 \; W.$$

Thus, the total power absorbed in components Z2 and CLD is 500 watts instead of 20 kilowatts in the component Z1 of the conventional system. An accurate determination of the clipping voltage and a limitation of the power dissipated in the components CLD and Z2 forming the overvoltage protection circuit according to the invention is thus achieved.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

What is claimed is:

1. A method for protecting a circuit to be protected from an overvoltage, comprising the steps of:

providing an avalanche diode between input ports of the circuit to be protected;

providing a device for limiting current to a predetermined value in series with the avalanche diode, between one of the input ports of the circuit and a voltage applying terminal;

selecting a breakdown voltage of the device to be greater than a difference between a maximum predetermined overvoltage against which the circuit is to be protected and a clipping voltage of the avalanche diode; and operating the device in a constant current operating region only when a voltage at the voltage applying terminal is greater then or equal to the clipping voltage of the avalanche diode.

2. The method according to claim 1, wherein the device for limiting current is a transistor and wherein the transistor is formed such that a gate of the transistor is tied to a source of the transistor.

3. The method of claim 1, wherein the maximum predetermined overvoltage is greater than 500 volts.

4. A method for limiting a total power to be absorbed in an avalanche diode disposed between input ports of a circuit to be protected, comprising the steps of:

providing a device for limiting current to a predetermined value disposed in series with the avalanche diode, and between a respective input port of the circuit to be protected and a voltage applying terminal;

selecting a breakdown voltage of the device to be greater than a difference between a maximum predetermined overvoltage against which the circuit is to be protected and a clipping voltage of the avalanche diode; and operating the device in a constant current operating region only when a voltage at the input ports is greater then or equal to the clipping voltage of the avalanche diode.

5. The method of claim 4, wherein the maximum predetermined overvoltage is greater tan 500 volts.

6. An overvoltage protection circuit for limiting the voltage across a first and second terminal, comprising:

an avalanche diode for disposition between the first and second terminals;

a device for limiting a current therethrough to a predetermined current value, the device connected in series within the avalanche diode for disposition between the first terminal and a voltage applying terminal, said device being constructed and arranged to withstand a voltage higher than a difference between a maximum predetermined overvoltage applied at the voltage applying terminal and a clipping voltage of the avalanche diode, wherein the device is constructed and arranged to have a constant current operating region in which the device only operates in the constant current operating region when the voltage across the first and second terminals is greater than or equal to the clipping voltage of the avalanche diode.

7. The protection circuit of claim 6, wherein the device is a MOS transistor having its gate and its source connected together, and wherein the source and a drain of the transistor are connected between the first terminal and the voltage applying terminal.

8. The overvoltage protection circuit of claim 6, wherein the maximum predetermined overvoltage is greater than 500 volts.

9. An overvoltage protection circuit for limiting the voltage across a first and second terminal, comprising:

an avalanche diode for clipping a voltage applied between first and second terminals; and means for limiting current to a predetermined value, the means for limiting disposed in series with the avalanche diode for diposition between the first terminal and a voltage applying terminal, said means for limiting being able to withstand a voltage higher than a difference between a maximum predetermined overvoltage applied to said voltage applying terminal and a clipping voltage of the avalanche diode, wherein the means for limiting includes a constant current operating region in which the means for limiting only in the constant current operating region when a voltage across the first and second terminal is greater than or equal to the clipping voltage of the avalanche diode.

10. The overvoltage protection circuit as claimed in claim 9, wherein the means for limiting current is a MOS transistor and the MOS transistor includes a gate tied to a source and wherein the source and a drain of the transistor are connected between the first terminal and the voltage applying terminal.

11. The overvoltage protection circuit of claim 9, wherein the maximum predetermined overvoltage is greater than 500 volts.

12. An overvoltage protection circuit for limiting an input voltage across first and second terminals, comprising:

a protection diode having an avalanche voltage, for disposition between the first and second terminals; and a device for limiting a current therethrough to a predetermined current value, the device to be coupled to a voltage source and the first terminal, wherein the device is constructed and arranged to have a breakdown voltage that is higher than a difference between a maximum predetermined overvoltage of the voltage source and the avalanche voltage of the protection diode, and further constructed and arranged to have a constant current operating region in which the device only operates in the constant current operating region when the input voltage is greater than or equal to the avalanche voltage of the protection diode.

13. The overvoltage protection circuit of claim 12, wherein the maximum predetermined overvoltage is greater than 500 volts.

* * * * *